United States Patent [19]

Allen

[11] 4,316,654

[45] Feb. 23, 1982

[54] EYEGLASS FRAME WITH POCKET CLIP

[76] Inventor: Charles B. Allen, 5 Briarfield La., Huntington, N.Y. 11743

[21] Appl. No.: 126,770

[22] Filed: Mar. 3, 1980

[51] Int. Cl.³ .................. G02C 3/00; G02C 5/14; G02C 1/00
[52] U.S. Cl. .................................. 351/155; 351/112; 351/158
[58] Field of Search .............. 351/158, 41, 59, 83, 351/51, 112, 155

[56] References Cited

U.S. PATENT DOCUMENTS 2,627,782  2/1953  May ........................................ 351/51
2,752,819  7/1956  Krukowshi ............................ 351/59

FOREIGN PATENT DOCUMENTS 1162365  4/1958  France ................................ 351/112

Primary Examiner—John K. Corbin
Assistant Examiner—Rodney Bovernick
Attorney, Agent, or Firm—Allison C. Collard; Thomas M. Galgano

[57] ABSTRACT

An improved frame for eyeglasses includes a pair of interconnected rims, each of which is configured to surround and support an eyeglass lens and at least one clasp superimposed over at least about ⅓ of the outer surface of one of the rims. The clasp is configured and dimensioned to correspond to the configuration and width of the portion of the outer surface of the rim over which it is superimposed. The clasp is also generally spaced above this portion of the rim outer surface to permit a portion of a user's garment to be inserted between the clasp and the rim. The clasp serves to releasably secure the eyeglass frame to a user's garment inserted between the rim and the clasp.

10 Claims, 6 Drawing Figures

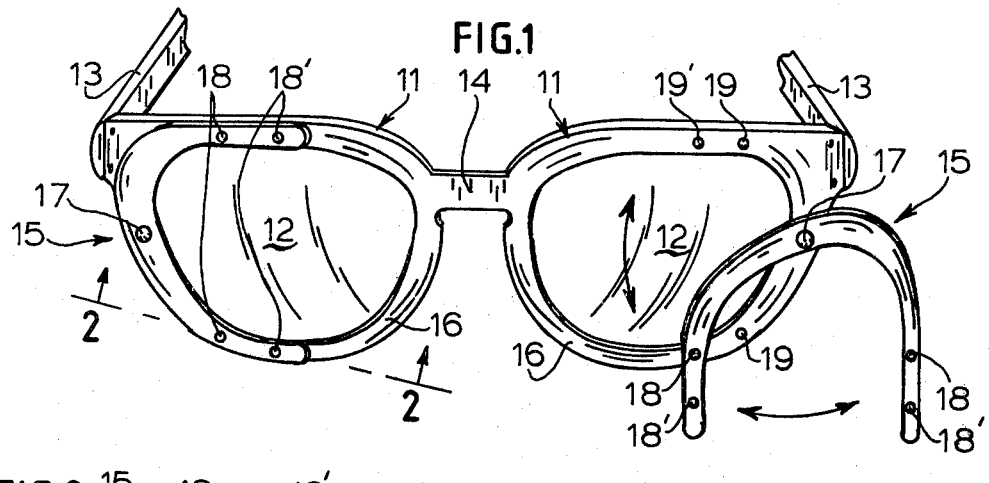
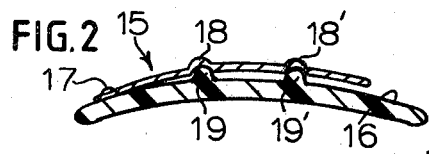
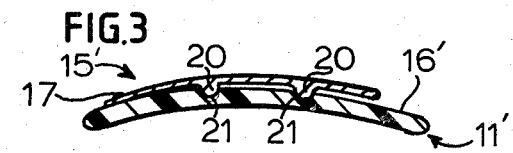
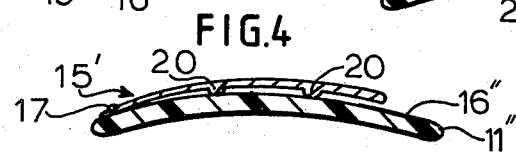
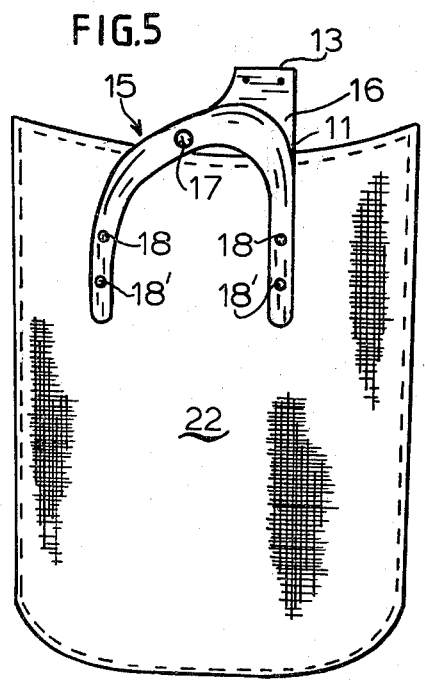
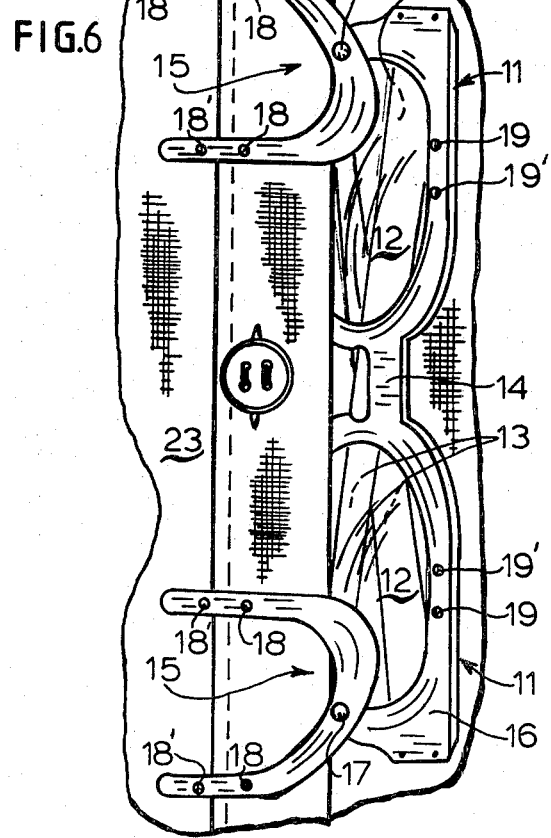

EYEGLASS FRAME WITH POCKET CLIP

The present invention relates to an improved frame for eyeglasses. More particularly, it relates to an eyeglass frame provided with means for releasably adhering the eyeglasses to a pocket or other portion of an eyeglass wearer's garment when not in use so as to avoid the possibility of the glasses being dropped and broken.

Various types of eyeglass frames are, of course, well known in the art. It has been previously proposed to provide eyeglass frames with clasps mounted adjacent to the temple bars or sidepieces which extend rearwardly beyond and above the ears to enable the eyeglasses to be safely carried within the pocket of the user (see, e.g., U.S. Pat. Nos. 2,042,400 and 2,097,371).

While it would appear that such types of clasps are generally satisfactory, they do have the disadvantage that they are not suitable for shallow pockets. In addition, they do not permit secure and facile fastening to a pocketless, button-down shirt. Furthermore, they add additional and quite noticeable hardware to the eyeglass frame which can be considered aesthetically unpleasing.

It is therefore an object of the present invention to provide a novel improved frame for eyeglasses having means for releasably adhering the eyeglasses to a pocket or other portion of a user's garment.

It is also an object of the present invention to provide such a novel eyeglass frame which is relatively simple in design, reliable, effective, easy to use, and economical to manufacture.

It is a more particular object of the present invention to provide a novel improved eyeglass frame having the foregoing attributes and characteristics which is both functional and aesthetically pleasing.

Certain of the foregoing and related objects are attained in accordance with the present invention by the provision of an improved frame for eyeglasses which includes a pair of interconnected rims, each of which has an outer surface and is configured to surround and support an eyeglass lens and at least one clasp superimposed over at least about one-third and, preferably up to about two-thirds, of the outer surface of one of the rims. The clasp is configured and dimensioned to correspond to the configuration and width of the portion of the outer surface over which it is superimposed and it is generally spaced above the outer surface to permit a portion of a user's garment to be inserted between the clasp and the rim. The clasp has means cooperating therewith for releasably securing the frame to a user's garment inserted between the rim and the clasp.

Most advantageously, the clasp is pivotably secured to the rim. It is desirable that the clasp have a generally arcuate configuration as well as a pair of opposite arms which resiliently engage the outer surface of the rim; the arms in cooperation with the opposing contacting portions of the outer surface defining the aforementioned means for releasably securing the garment between the clasp and the rim.

In one preferred embodiment of the invention, the arms of the clasp each have at least one protuberance formed on the underside thereof which resiliently engages the outer surface of the associated rim. Most desirably, the outer surface of the rim is provided with complementary-configured and positioned dimples for the at least partial receipt therein of the protuberances.

In a particularly preferred embodiment, the rim has at least a pair of protuberances formed on the outer surface thereof and the clasp arms each have at least one complementary-configured and positioned dimple formed on the underside thereof for at least the partial receipt therein of one of the protuberances. If is further advantageous if the arms each have at least two spaced-apart dimples formed on the underside thereof adjacent to the ends of the arms and that the clasp is pivotable between two operative positions, a first position wherein the clasp is superimposed over the outer surface of the rim with the protuberances in engagement with their corresponding dimples, and a second position displaced over an arc of about 90° from the first position, wherein at least one of the protuberances engages one of the dimples. Finally, it is also desirable that the frame has a pair of clasps, each of which is associated with one of the rims.

Other objects and features of the present invention will become apparent from the following detailed description, considered in connection with the accompanying drawings, which disclose several embodiments of the invention. It is to be understood, however, that the drawing is designed for the purpose of illustration only, and not as a definition of the limits of the invention.

In the drawing, wherein similar reference characters denote similar elements throughout the several views:

FIG. 1 is a fragmentarily-illustrated perspective view of an improved frame for eyeglasses embodying the present invention having two clasps, each of which is shown in a different operative position;

FIG. 2 is a sectional view taken along line 2—2 of FIG. 1;

FIG. 3 is a sectional view comparable to that of FIG. 2, but showing an alternate embodiment of the invention;

FIG. 4 is a sectional view similar to that of FIGS. 2 and 3 but showing a further embodiment of the invention;

FIG. 5 is a front elevational view showing the eyeglasses mounted in a user's pocket; and FIG. 6 is a front elevational view showing the eyeglasses with the clasps rotated 90° from their normal position and showing the eyeglasses being secured to the vertical edge of the user's shirt adjacent the row of button-holes.

Turning now in particular to FIG. 1, therein illustrated is a novel eyeglass frame embodying the present invention which includes a generally conventional eyeglass frame consisting of a pair of rims 11, each of which is configured to support and surround an eyeglass lens 12. Each rim is pivotably connected to a temple bar or sidepiece 13 which is intended to extend rearwardly beyond and above the wearer's ear, when unfolded. Rims 11 are interconnected by a bridge member 14.

A pair of relatively thin, resilient clasps 15, each of which has a generally arcuate or U-shaped configuration, are each pivotably mounted on the outer surface 16 of one of the rims 11 by means of a pivot pin or rivet 17. Clasps 15 are each configured and dimensioned to correspond to the configuration and width of the portion of the outer surface 16 over which they are superimposed. Clasps 15 typically extend over at least about one-third of the outer surface of the associated rim, although it is preferable that they extend over at least one-half and up to about two-thirds of the outer surface of the rims; the purpose thereof will be described in greater detail hereinafter.

Clasps 15 are generally spaced above outer surface 16 of its associated rim 11 to permit a portion of a user's garment to be inserted therebetween. To facilitate ready but releasable securement of the portion of the garment between clasps 15 and rims 11, clasps 15 are each provided with a pair of spaced-apart dimples 18, 18' adjacent the free ends of each of the arms thereof. The outer surface 16 of the associated rims 11 are correspondingly provided with a pair of complementary-configured and positioned spaced-apart protuberances 19, 19' on both the upper and lower rim portions thereof which are at least partially receivable in dimples 18 and 18', respectively, so as to effect resilient engagement between clasps 15 and rims 11 (see FIG. 2).

In an alternate embodiment as shown in FIG. 3, protuberances 20 are provided on the underside of the clasp 15' and the dimples 21 are formed in the outer surface 16' of rim 11'. In yet a further embodiment shown in FIG. 4, clasp 15 is again provided with protuberances 20 on the underside thereof, but in this case, no corresponding dimples are formed in the outer surface 16'' of the rim 11''. Regardless of whether the protuberances are used either alone or in combination with the dimples, resilient engagement is effected between the clasp and the eyeglass rim so that when a portion of the user's garment is inserted therebetween, the eyeglass frame will be securely, although releasably, fastened to the garment.

This is more clearly shown in FIG. 5, wherein the eyeglass frame is secured in the pocket 22 of a garment. Due to the fact that there are four contact points (i.e., 18-19 and 18'-19' for each arm of clasp 15), the eyeglass frame is held securely in the pocket. Furthermore, it should be pointed out that due to the fact that clasps 15 extend over approximately two-thirds of rim 11, clasps 15 will be functionable even in shallow pockets since the outermost dimples 19' and protuberances 18' should at least engage a portion of the pocket, even though the innermost cooperating pairs of dimples 19 and protuberances 18 might not. Of course, it should also be realized that more than two corresponding sets or protuberances could be formed on the arms of the clasps so as to increase the points of contact. It should also be appreciated that due to the fact that each rim is provided with a clasp, the glasses may be inserted into the pocket from either end of the frame.

As shown in FIG. 6, due to the pivotable mounting of clasp 15', the eyeglass frame may also be stored vertically in the portion 23 of a man's shirt where it is buttoned (along the vertical shirt edge along the row of button-holes) by merely pivoting clasps 15 from their initial position (the position shown for the clasp 15 on the left side in FIG. 1) over an arc of about 90° whereby each clasp 15 will have at least one point of contact with the outer surface of the rim; i.e., protuberance 19 of the lower rim portion resiliently engaging dimple 18 on the upper arm of clasp 15. The eyeglass frame is then positioned substantially beneath the shirt front panel 23 while the clasps are disposed thereover with clasps 15 acting somewhat in the same manner as conventional horizontally disposed tie clasps, the only real difference being that it secures an eyeglass frame to the shirt front rather than a tie. Depending on the shape of the eyeglass frame, at the most, only half of the lens would typically protrude from behind the shirt front; this, of course, can be maximized by locating the rivet 17 or pivot point closer to the top of the frame.

It should be realized that since nearly all lenses have a certain degree of convexity, it is necessary that when clasps 15 are moved to the position shown in FIG. 6, they be moved on a pivot pin or rivet of sufficient height to prevent their lower surfaces from scratching the lenses. Relative to this feature, it should also be noted that clasps 15 serve to prevent the lenses from being scratched if the user removes the eyeglasses and places the lenses down on any hard surface.

It should of course be realized that the configuration of the clasps or clips will be dependent upon the type and shape of the eyeglass frames employed; the shape of the clasps conforming to the outer surface of the frame relative to their shape and width so as not to obstruct the vision of the wearer. In addition, the length of the arms of the clasps are of course variable, as well as the materials from which the clasps are made, although typically they will be made from the same material as the frame on which they will be mounted, such as plastic, so that they blend unobtrusively into the frame and provide a more aesthetically acceptable configuration.

It should also be pointed out that by use of the inventive clasps on the eyeglass frame, the user is afforded a maximum freedom of movement without the hazard of the eyeglasses jouncing out of the pocket. In addition, it eliminates the unsightly bulge in the user's suitcoat or jacket caused by the use of thick leather or plastic eyeglass cases. Since these cases are no longer needed and since the eyeglass frame even with the clasps is still relatively flat, a trimmer, more normal appearance is obtained. Furthermore, if a vest is worn, the eyeglasses could probably be inserted into one of the small vest pockets. Usually, the thickness of the case has precluded this.

While only several embodiments of the invention have been shown and described, it will be obvious that many modifications and changes may be made thereunto, without departing from the spirit and scope of the invention.

What is claimed is:
1. An improved frame for eyeglasses, comprising:
 a pair of interconnected rims, each of which is configured to surround and support an eyeglass lens, said rims each having a top, bottom and two side segments which cooperatively define an outer surface; and
 at least one clasp superimposed over at least about ⅔ of the outer surface of one of said rims and secured to the side segment thereof which is distal to the other of said rims, said clasp being configured and dimensioned to correspond to the configuration and width of the portion of the outer surfce over which it is superimposed, said clasp having a central section which normally overlies said distal side segment and two arms extending from opposite ends of said central segment which normally overlie at least a portion of said top and bottom segments of the associated rim, said clasp also being generally spaced above said portion of said outer surface to permit a portion of a user's garment to be inserted between said clasp and said rim and so as to effect releasable securement of said frame to a user's garment so inserted therebetween.
2. The frame according to claim 1, wherein said clasp is pivotably secured to distal side segment of said rim.
3. The frame according to claim 1, wherein said clasp has a generally arcuate configuration and said arms resiliently engaging the outer surface of said rim.

4. The frame according to claim 1, wherein said arms of said clasp each have at least one protuberance formed on the underside thereof which resiliently engages the outer surface of said rim.

5. The frame according to claim 4, wherein said outer surface of said rim has complementary-configured and positioned dimples for the at least partial receipt therein of said protuberances.

6. The frame according to claim 1, wherein said rim has at least a pair of protuberances formed on the outer surface thereof and wherein said arms each have at least one complementary-configured and positioned dimple formed on the underside thereof for at least the partial receipt therein of one of said protuberances.

7. The frame according to claim 6, wherein said clasp is pivotably mounted on said distal side segment of said rim, wherein said arms each have at least two spaced-apart dimples formed on the underside thereof adjacent the ends of said arms, and wherein said clasp is pivotable between two operative positions, a first position wherein said clasp is superimposed over said outer surface of said rim with said protuberances of said outer surface in engagement with their corresponding dimples on said arms, and a second position displaced over an arc of about 90° from said first position, wherein at least one of said protuberances engages one of said dimples.

8. The frame according to claim 7, wherein said frame has a pair of said clasps, each of which is associated with one of said rims.

9. The frame according to claim 1, wherein said clasp is superimposed over at least ½ of the outer surface of one of said rims.

10. The frame according to claim 1, wherein said clasp is superimposed over ⅔ of said outer surface of one of said rims.

* * * * *